United States Patent
Wang et al.

[11] Patent Number: 6,159,636
[45] Date of Patent: Dec. 12, 2000

[54] MIXTURES OF LITHIUM MANGANESE OXIDE SPINEL AS CATHODE ACTIVE MATERIAL

[75] Inventors: Enoch I. Wang, Mansfield, Mass.; William L. Bowden, Nashua, N.H.; Alwyn H. Taylor, Wellsley Hills, Mass.

[73] Assignee: The Gillette Company, Boston, Mass.

[21] Appl. No.: 09/260,157

[22] Filed: Mar. 1, 1999

Related U.S. Application Data

[60] Continuation-in-part of application No. 09/031,266, Feb. 26, 1998, which is a division of application No. 08/629,985, Apr. 8, 1996, Pat. No. 5,753,202.

[51] Int. Cl.⁷ .................................................. H01M 4/32
[52] U.S. Cl. ................ 429/223; 429/224; 429/231.1; 429/231.3; 429/231.6
[58] Field of Search ............................... 429/231.1, 224, 429/223, 231.6, 221, 231.3

[56] References Cited

U.S. PATENT DOCUMENTS

| | | | |
|---|---|---|---|
| 5,296,318 | 3/1994 | Gozdz et al. | 429/192 |
| 5,370,710 | 12/1994 | Nagaura et al. | 29/623.1 |
| 5,429,890 | 7/1995 | Pynenburg et al. | 429/192 |
| 5,683,835 | 11/1997 | Bruce | 429/224 |

OTHER PUBLICATIONS

C. Delmas, I. Saadoune and A. Rougier, "The Cycling Properties of LixNi1–yCoyO2 Electrode", Journal of Power Sources, 43–44 (1993), pp. 595–602.

*Primary Examiner*—Laura Weiner
*Attorney, Agent, or Firm*—Barry D. Josephs; Paul I. Douglas; Thomas G. Krivulka

[57] ABSTRACT

A method of making lithium manganese oxide of spinel structure is disclosed. The method involves the step of prelithiating a manganese oxide by reacting it with lithium hydroxide or lithium salt and then reacting the prelithiated manganese oxide in a second step at elevated temperature, for example, with lithium carbonate to form a lithium manganese oxide spinel. The spinel product may be used advantageously in secondary (rechargeable) batteries. The spinel product may be admixed with a partially substituted nickelite, preferably, $LiNi_xCo_{1-x}O_2$ ($0.1<x<0.9$) or $LiNi_xMg_{1-x}O_2$ ($0.85<x<0.97$) and mixtures thereof to form the active material for the positive electrode of a rechargeable lithium ion cell. A preferred mixture for the positive electrode of lithium ion cells comprises lithium manganese oxide spinel and $LiNi_xCo_{1-x}O_2$ ($0.1<x<0.9$). The positive electrode for lithium ion cells may also be formed of a layer comprising active material of lithium manganese oxide spinel overlayed with a second layer comprising active material formed of a partially substituted nickelite, preferably $LiNi_xCo_{1-x}O_2$ ($0.1<x<0.9$) or $LiNi_xMg_{1-x}O_2$ ($0.85<x<0.97$) and mixtures thereof.

12 Claims, 1 Drawing Sheet

MIXTURES OF LITHIUM MANGANESE OXIDE SPINEL AS CATHODE ACTIVE MATERIAL

This application is a continuation in part of application Ser. No. 09/031,266, filed Feb. 26, 1998, which is a Divisional of Application Ser. No. 08/629,985, filed Apr. 8, 1996 issued as U.S. Pat. No. 5,753,202.

This invention relates to a method of preparation of lithium manganese oxide compound of spinel structure and its use in secondary batteries.

The prior art discloses methods of preparing lithium manganese oxide ($LiMn_2O_4$) of spinel crystalline structure for use in secondary batteries. In one prior art method $LiMn_2O_4$ powders are prepared by heating a mixture of lithium carbonate and manganese oxide powders in air at temperatures between about 800° C. and 900° C. (D. G. Wickham & W. J. Croft, J.Phys. Chem. Solids, Vol. 7, p.351 (1958)) In another method (U.S. Pat. No. 5,135,732) hydroxides of lithium and ammonium in solution with manganese acetate in a sol-gel colloidal suspension are reacted to yield lithium manganese oxide spinel compound. The reactions must be conducted in an inert atmosphere producing a gelatinous precipitate which is dried to yield granular lithium manganese oxide spinel for use in secondary cells. In still another method lithium carbonate is reacted with manganese acetate to produce lithium manganese oxide spinel precipitate which is dried. (U.K. Patent Application GB 2276155) Lithium manganese oxide spinel product made by such prior art methods exhibits considerable loss in capacity during secondary cell cycling.

U.S. Pat. No. 5,370,710 discloses a lithium rechargeable cell wherein the positive electrode comprises lithium manganese oxide ($Li_{1+x}Mn_2O_4$) spinel as the active material. This reference does not contemplate mixing other active materials with the spinel to improve performance.

U.S. Pat. No. 5,429,890 discloses a lithium ion rechargeable cell having a solid electrolyte wherein the positive electrode comprises active material which is a physical mixture of lithium manganese oxide ($Li_xMn_2O_4$) spinel and at least one lithiated metal oxide selected from the group consisting of $Li_xNiO_2$ (nickelite) and $Li_xCoO_2$ (lithium cobalt oxide). This reference discloses that such cathode mixture when used in lithium ion cells having a solid electrolyte, results in a smooth voltage profile upon discharge, substantially without inflections and discontinuities.

The method of the invention involves the step of first forming a reaction mixture comprising a manganese oxide and a lithium salt or lithium hydroxide or mixture of a lithium salt and lithium hydroxide. The manganese oxide, for example, may be $MnO_2$, $Mn_2O_3$, $Mn_3O_4$ or MnOOH or mixtures thereof. The lithium salt preferably is lithium nitrate, lithium carbonate, lithium acetate, lithium sulfate or any mixture thereof. Lithium hydroxide or other lithium salts of a weak acid may be used. The mixture is reacted to form a prelithiated manganese oxide (Li.(Mn oxide)), namely, $Li_xMnO_2$, $Li_xMn_2O_3$, $Li_xMn_3O_4$ or $Li_xMnOOH$, respectively, where in each case 0.015<x<0.2. The prelithiated manganese oxide is preferably then separated from the reaction mixture and subsequently may be reacted with lithium hydroxide (LiOH), lithium nitrate ($LiNO_3$), lithium acetate ($Li(CH_3COO)$), lithium sulfate ($Li_2SO_4$), or lithium carbonate ($Li_2CO_3$) or other lithium salt in a separate step to produce manganese oxide of spinel structure.

The method of the invention is easier to apply and control than prior art methods. The lithium manganese oxide spinel product made by the method of the invention exhibits improved cyclability and improved storability characteristics en used as a positive electrode in secondary (rechargeable) cells having a negative electrode comprising lithium or lithium ions. The improved performance is characterized, for example, by less irreversible capacity loss on cycling when the spinel is used in the positive electrode in secondary cells. It is not known with certainty why this occurs but it is conjectured that the prelithiation forms at least a portion of the lattice framework of the spinel crystalline structure. This seems to make it easier to produce a final lithium manganese oxide spinel product with minimum flaws in the spinel crystalline structure thereby enhancing the performance characteristics of the spinel product in secondary cells. Also, it is conjectured that the presence of small amounts of lithium adsorbed or chemically bound at the surface of the prelithiated manganese oxide $Li_x$(Mn oxide) may have a strong impact on the morphology of the spinel product made therefrom. Such surface characteristics may enhance the performance of the spinel in secondary cells.

The prelithiation reaction is carried out within a temperature range which will achieve the above stated desired degree of prelithiation, but which temperature range is nevertheless low enough that essentially no lithium manganese oxide of spinel structure having the stoichiometric formula, $Li_xMn_2O_{4+d}$ (0.9<x<1.2 and 0<d<0.4) is formed. "Essentially no formation" of said lithium manganese oxide spinel shall be construed to mean that if any of said lithium manganese oxide spinel is formed during the prelithiation reaction it will be formed from less than 5 percent by weight of the starting manganese oxides, that is, between about 0 and 5 percent by weight of the starting manganese oxides may ultimately be converted to $Li_xMn_2O_{4+d}$ (0.9<x<1.2 and 0<d<0.4) during the prelithiation reaction. The prelithiation reaction to achieve these results is carried out within a temperature range between about 4 and 400° C., advantageously between about 4 and 90° C., preferably between about 20 and 50° C. for a period of time preferably between about 0.5 and 15 hours. The prelithiation reaction is preferably carried out in an aqueous solution, but may also be carried out in solid phase, for example, when the reactants are lithium nitrate or lithium hydroxide. The prelithiated manganese oxide Li.(Mn oxide) may then be reacted with lithium hydroxide or lithium salt, preferably lithium nitrate, lithium acetate, lithium sulfate or any mixture thereof within a higher temperature range, preferably between about 650 and 900° C., for a period of time preferably between about 24 and 48 hours to produce lithium manganese oxide of spinel structure having a stoichiometric formula $Li_xMn_2O_{4+d}$ (0.9<x<1.2 and 0<d<0.4.).

The lithium manganese oxide spinel $Li_xMn_2O_{4+d}$ (0.9<x<1.2 and 0<d<0.4.) made by the process of the invention may be used as the active material in cathodes (positive electrode) of rechargeable lithium ion cells. The spinel may be used in admixture with other cathode active materials in lithium ion cells. The term "lithium ion cell" as used herein refers to a secondary (rechargeable cell) characterized by the transfer of lithium ions from negative electrode to positive electrode upon cell discharge and from the positive electrode to the negative electrode upon cell charging. The negative electrode may typically comprise carbon with lithium ions intercalated (inserted) therein, or the negative electrode may comprise lithium metal. The negative electrode constitutes the anode of the cell during discharge and the cathode during charging and the positive electrode constitutes the cathode of the cell during discharge and the anode during charging. Reference to anode and cathode hereinafter will be to the cell as being discharged, that is, the anode and cathode will correspond to the cell's negative and positive electrode, respectively. The electrolytes for all of the cell embodiments described hereinafter may be solid or liquid during the useful life of the cell. The electrolyte may be a liquid electrolyte comprising a lithium salt dissolved in a mixture of non-aqueous solvents. The lithium salt in the liquid electrolyte may desirably be lithium hexafluorophosphate ($LiPF_6$), lithiumtetrafluoroborate ($LiBF_4$), lithiumtrifluorosulfonimide, lithiumperchlorate ($LiClO_4$), lithiumhexafluoroarsenate ($LiAsF_6$) and mixtures thereof. The liquid electrolyte may be readily prepared by dissolving the lithium salts in a nonaqueous solvent of propylene carbonate, ethylene carbonate, diethylcarbonate, ethylmethycarbonate, dimethoxyethane, tetrahydrofuran, and mixtures of two or more thereof. A preferred salt may be lithium hexafluorophosphate ($LiPF_6$) and preferred solvent may advantageously include dimethyl carbonate (DMC), ethylene carbonate (EC), propylene carbonate (PC) and mixtures thereof. The term "active material" as used herein refers to electrode material which undergoes a chemical change involving oxidation or reduction during charging or discharging of the cell. Alternatively, the electrolyte may be a solid electrolyte conventionally employed in lithium ion cells, for example as described in U.S. Pat. No. 5,296,318 herein incorporated by reference in its entirety. The term solid electrolyte as used herein shall include electolytes which are solid or semisolid, for example, in the form of a gel.

In another aspect of the invention it has been determined that increased specific capacity (milliAmp-hrs/g), as well as improved cylclability (increased capacity retention per cycle) and increased safety of lithium ion cells may be obtained by forming the cathode (positive electrode) of a mixture of lithium manganese oxide spinel $Li_xMn_2O_{4+d}$ ($0.9<x<1.2$ and $0<d<0.4$) and a partially substituted nickelite. A partially substituted nickelite may be defined as a compound of lithium, nickel, oxygen and at least one other metal, wherein the ratio of oxygen atoms to lithium atoms in the compound is 2. The partially substituted nickelites which can be advantageously admixed with $Li_xMn_2O_{4+d}$ spinel ($0.9<x<1.2$ and $0<d<0.4$) to form cathodes for lithium ion cells may desirably be selected from $LiNi_{(1-x)}Al_xO_2$ ($x_{max}=0.25$), $LiNi_{(1-x)}Fe_xO_2$, $LiNi_{(1-x)}Mn_xO_2$, $LiNi_{(1-x)}Ti_{(x/2)}Mg_{(x/2)}O_2$ ($x_{max}=0.25$) and $LiNi_{(1-x-y)}Co_{(x)}Ti_{(y/2)}Mg_{y/2}O_2$, $LiNi_xCo_{1-x}O_2$ ($0.1<x<0.9$) or $LiNi_xMg_{1-x}O_2$ ($0.85<x<0.97$) or mixtures thereof. Specifically, it has been determined that partially substituted nickelite, preferably $LiNi_xCo_{1-x}O_2$ ($0.1<x<0.9$) or $LiNi_xMg_{1-x}O_2$ ($0.85<x<0.97$) and mixtures thereof, can be admixed with lithium manganese oxide spinel $Li_xMn_2O_{4+d}$ ($0.9<x<1.2$ and $0<d<0.4$) to form positive electrodes (cathodes) of lithium ion cells having improved capacity and reduced irreversible capacity loss upon cycling compared to cathodes employing $Li_xMn_2O_{4+d}$ spinel alone as active material. The cathodes formed of such mixtures may be used in lithium ion cells having solid or liquid electrolyte, but may be preferentially employed in lithium ion cells having liquid electrolyte. The cathode formed of such mixtures of $Li_xMn_2O_{4+d}$ (spinel) and $LiNi_xCo_{1-x}O_2$ ($0.1<x<0.9$) or $LiNi_xMg_{1-x}O_2$ ($0.85<x<0.97$) and mixtures thereof are believed to be safer than cathodes formed of $LiCoO_2$ as active material. The above described mixtures of lithium manganese oxide spinel $Li_xMn_2O_{4+d}$ ($0.9<x<1.2$ and $0<d<0.4$) and a partially substituted nickelite may be advantageously employed as active material in the cathode (positive electrode) in conventional lithium ion cells employing conventional liquid or solid electrolytes, above referenced.

A preferred positive electrode (cathode) for lithium ion cells comprises a mixture of $Li_xMn_2O_{4+d}$ ($0.9<x<1.2$ and $0<d<0.4$) and $LiNi_xCo_{1-x}O_2$ ($0.1<x<0.9$). Positive electrodes (cathodes) for lithium ion cells formed of such mixtures exhibit improved performance and cyclability over cathodes employing $Li_xMn_2O_{4+d}$ spinel alone as active material or cathodes with mixtures of $Li_xMn_2O_{4+d}$ spinel and $LiNiO_2$ nickelite. Also, cathodes for lithium ion cells comprising a mixture of $Li_xMn_2O_{4+d}$ ($0.9<x<1.2$ and $0<d<0.4$) and $LiNi_xCo_{1-x}O_2$ ($0.1<x<0.9$) can be safer than conventional lithium ion cathodes, namely, cathodes comprising $LiCoO_2$, and pose less of a potential environmental hazard upon disposal than such conventional cathodes.

Preferably, the active material in the positive electrode (cathode) may comprise $Li_xMn_2O_{4+d}$ spinel and dopant comprising essentially $LiNi_xCo_{1-x}O_2$ ($0.1<x<0.9$). The cathode is formed by preparing a mixture of cathode active material and small amount of carbon and binder such as tetrafluoroethylene (TEFLON) and coating the mixture onto a metal support. In such case the $Li_xMn_2O_{4+d}$ spinel and dopant comprising essentially $LiNi_xCo_{1-x}O_2$ may advantageously comprise between about 50 and 95 percent by weight of the positive electrode, preferably about 90 percent by weight of the positive electrode (exclusive of the support onto which the cathode material may be applied). The $LiNi_xCo_{1-x}O_2$ may comprise between about 10 and 50 percent by weight, preferably between about 30 and 40 percent by weight of the positive electrode (exclusive of the support). The weight ratio of $LiNi_xCo_{1-x}O_2$ to $Li_xMn_2O_{4+d}$ spinel in the cathode may desirably be between about 0.04 and 0.50, preferably between about 0.25 and 0.40.

In another aspect the positive electrodes (cathodes) for lithium ion cells may be formed by applying a first layer on a conductive substrate such as a substrate composed of titanium, stainless steel, aluminum, aluminum alloys. The first layer may comprise $Li_xMn_2O_{4+d}$ spinel ($0.9<x<1.2$ and $0<d<0.4$) as active material, and may be the only active material in the first layer or it may be admixed with a partially substituted nickelite. The active material in the first layer may be comprised of $Li_xMn_2O_{4+d}$ spinel and a partially substituted nickelite. Preferentially, the first layer may be comprised essentially of $Li_xMn_2O_{4+d}$ spinel, for example, the active material in the first layer may advantageously consist only of $Li_xMn_2O_{4+d}$ spinel. A second layer, namely, a layer containing active material comprised essentially of a partially substituted nickelite, for example, $LiNi_xCo_{1-x}O_2$ or $LiNi_xMg_{1-x}O_2$ or mixtures thereof, is applied over the first layer, thus forming a bi-layered positive electrode. The active material in the positive electrode (first and second layers) comprises between about 50 and 95 percent by weight of the positive electrode (excluding the conductive substrate) desirably between about 30 and 40 percent by weight of the positive electrode (excluding the conductive substrate). The weight ratio of the partially substituted nickelite active material in the second layer to the active material comprising essentially $Li_xMn_2O_{4+d}$ spinel in the first layer may advantageously be between about 0.04 and 0.50, preferably between about 0.25 and 0.40. Preferably, the active material in the second layer comprises $LiNi_xCo_{1-x}O_2$ ($0.1<x<0.9$) or $LiNi_xMg_{1-x}O_2$ ($0.85<x<0.97$) or mixtures thereof, wherein said active material in the second layer comprises between about 10 and 50 percent, preferably, between about 30 and 40 percent by weight of the positive electrode (excluding any metal substrate for the positive electrode). A preferred substituted nickelite $LiNi_xCo_{1-x}O_2$ has the formula $LiNi_{0.8}Co_{0.2}O_2$.

A feature of the invention may be better appreciated with reference to the following drawings.

Figure 1:
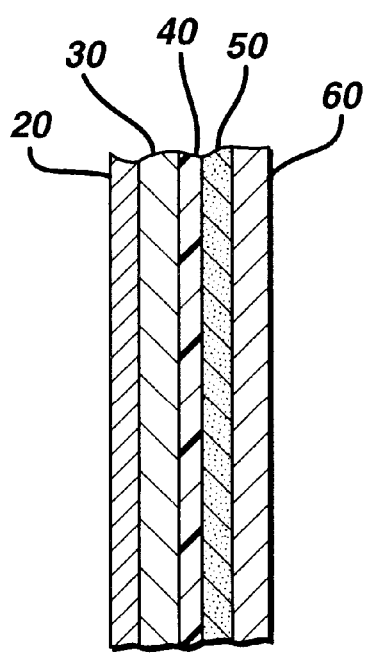
FIG. 1 is a schematic drawing showing an embodiment of the cathode construction in cross section.

In a preferred embodiment of the invention manganese dioxide powder (and even more preferably electrolytic manganese dioxide (EMD)) is reacted with lithium hydroxide which has the effect of prelithiating the manganese dioxide forming $Li_xMnO_2$ (0.015>x>0.070). The prelithiated manganese dioxide is then preferably heated to convert it to lithium manganese sesquioxide ($Li_xMn_2O_3$) which in turn may be reacted preferably with lithium carbonate ($Li_2CO_3$) to form lithium manganese oxide spinel. Alternatively, the intermediate step of converting the prelithiated manganese dioxide to $Li_xMn_2O_3$ may be omitted by reacting the prelithiated manganese dioxide directly with lithium carbonate to form lithium manganese oxide spinel.

In accordance with a specific embodiment of the invention manganese dioxide powder is advantageously first washed with acid, preferably with sulfuric acid which has the effect of removing trace amounts of sodium ions or other ion exchangeable cations trapped within the manganese dioxide particles. The acid washed $MnO_2$, is rinsed first and then suspended in fresh deionized water. Lithium hydroxide is added to the suspension over a period of time between about 0.5 and 15 hours while the suspension with added lithium hydroxide is maintained at all time at a temperature of between about 20 and 50° C. The lithium hydroxide is added during this period until a pH of between about 7 and 14, preferably between about 7 and 11, is reached forming a prelithiated manganese dioxide having a stoichiometric formula $Li_xMnO_2$ ( 0.015>x>0.070). The prelithiated manganese dioxide is filtered and dried whereupon it is heated at temperatures between about 550° C. and 600° C., to convert it to lithium manganese sesquioxide, $Li_xMn_2O_3$ (0.015>x>0.070). The lithium manganese sesquioxide $Li_xMn_2O_3$ in turn is reacted with lithium carbonate, $Li_2CO_3$, at temperatures between about 650° C. and 800° C. forming lithium manganese oxide spinel of stoichiometric formula $Li_xMn_2O_{4+d}$, where 0.9<x<1.2 and 0<d<0.4. (It will be appreciated that the stoichiometric formulas $Li_xMnO_2$ and $Li_xMn_2O_3$ are intended to include the same compounds, respectively, having slightly more or less oxygen than is indicated in the formula. Therefore, it should be understood that whenever these compounds are referenced herein, the more general formulas $Li_xMnO_{2+f}$ and $Li_xMn_2O_{3+e}$, respectively, are applicable. Typically, f may be between about −0.05 and +0.05 and e may be between about −0.01 and +0.01.)

In an alternative embodiment the prelithiated manganese dioxide ($Li_xMnO_2$)is made as above described but the step of converting it first to lithium sesquioxide ($Li_xMn_2O_3$) may be omitted. Instead the prelithiated manganese dioxide may be converted directly to lithium manganese dioxide spinel by reacting it directly with lithium carbonate at temperatures between about 650° C. and 800° C. This embodiment while having the advantage of omitting a step has the disadvantage that the final spinel will contain more lattice moisture (OH$^-$ in place of oxygen atoms at defect sites within the spinel structure.) Thus, a purer spinel product, namely, with less lattice moisture, is achieved by first converting prelithiated manganese dioxide to lithium manganese sesquioxide before the final conversion to spinel, e.g. by reacting the lithium manganese sesquioxide with lithium carbonate as above described. Such purer spinel product leads to improved performance characteristics when it is used as the positive electrode in secondary cells. Other specific embodiments of the invention are reflected in the following representative examples:

EXAMPLE 1

A saturated solution of lithium hydroxide is first made by adding excess lithium hydroxide, 100 grams, to 300 milliliter deionized water and maintaining the mixture overnight while stirring. The following day the undissolved solids are filtered out resulting in a saturated lithium hydroxide solution which is set aside.

A 100 gram sample of particulate electrolytic manganese dioxide (battery grade EMD from Kerr-McGee Corp. lot no. 9864) is acid washed by adding 1000 milliliter of 1 molar $H_2SO_4$ and stirring the mixture for 1 hour. At the end of the hour the stirring is stopped and the acid solution is poured off leaving the electrolytic manganese dioxide (EMD) behind. The EMD is subjected to a second washing with 1 molar $H_2SO_4$, same as the first. After the second washing the acid solution is poured off and the EMD is rinsed with deionized water and allowed to stand overnight. The following day the EMD is rinsed 3 additional times with fresh deionized water. After the last water rinse the water is poured off leaving the EMD behind.

The saturated solution of lithium hydroxide is then poured onto the EMD and stirred for 24 hours while maintaining the mixture at a temperature of 22° C. The following day the solid material is filtered out from the hydroxide solution and dried. Analysis showed the material to be of stoichiometric formula $Li_{0.15}MnO_2$. The material is then heated to 600° C. for 24 hours to convert it to $Li_{0.15}Mn_2O_3$. This material is then heated with lithium carbonate at a temperature of 750° C. for 24 hours to form the lithium manganese oxide spinel product of stoichiometric formula $Li_xMn_2O_{4+d}$ (x=1.05,d=0.2).

EXAMPLE 2

A 2000 gram sample of particulate electrolytic manganese dioxide (battery grade EMD from Kerr-McGee Corp. lot no. 9864) is acid washed by adding 2500 milliliter of 1 molar $H_2SO_4$ and stirring the mixture for 1 hour. At the end of the hour the stirring is stopped and the acid solution is poured off leaving the electrolytic manganese dioxide (EMD) behind. The EMD is subjected to a second washing with 1 molar $H_2SO_4$, same as the first. After the second wash the acid solution is poured off and the EMD rinsed with deionized water and allowed to stand overnight. The following day the EMD is rinsed three additional times with fresh deionized water. After the last water rinse the EMD is suspended in fresh deionized water and 85 grams of lithium hydroxide is added over a period of time of about 5 minutes to bring the pH to 11.0 all the while maintaining the mixture at a temperature of 22° C. The solution is stirred for 30 minutes at this temperature and then the solid material is filtered out and dried. Analysis showed the material to be of stoichiometric formula $Li_{0.067}MnO_2$. The material is heated to 600° C. for 24 hours to convert it to $Li_{0.067}Mn_2O_3$. This material is then heated with lithium carbonate at 750° C. for 24 hours to form a spinel product of stoichiometric formula $Li_xMn_2O_{4+d}$ (x=1.05,d=0.2).

EXAMPLE 3

A 500 gram sample of particulate electrolytic manganese dioxide (battery grade EMD from Kerr-McGee Corp. product no. 9864) is acid washed by adding 2 liters of 1 molar $H_2SO_4$ and stirring for 1 hour. The acid solution is then poured off and the electrolytic manganese dioxide (EMD) is subjected to a second washing, same as the first, with fresh acid solution. The EMD is then rinsed by immersing it in fresh deionized water and allowing it to stand overnight whereupon it is filtered and dried.

The EMD is divided into four equal portions, (125 gm. each) from which four spinel samples are prepared (samples 3A–3D). Each of the four 125 gm. portions of the EMD is suspended in fresh deionized water and stirred for 15 minutes.

Each EMD portion is subjected to water rinsing two more times and the material then filtered and dried. The first 125 gram portion of EMD, is set aside to make a control spinel product (sample 3A) that is made without subjecting the EMD to treatment with lithium hydroxide and the remaining three EMD portions are used to prepare a spinel product employing the prelithiation step of the invention.

A comparative spinel (sample 3A) without prelithiation is made as follows:

125 gm. portion of the rinsed and dried EMD is heated to 600° C. for 24 hours to convert it to $Mn_2O_3$. This material is heated to temperatures between about 700° C. and 900° C. with lithium carbonate to form the spinel product of formula $Li_xMn_2O_{4+d}$ (x=1.05, d=0.2).

A spinel product (sample 3B) with prelithiation is made as follows:

Approximately 125 grams of the rinsed and dried EMD is suspended in fresh deionized water and 1.2 grams of lithium hydroxide is added over a period of about 5 minutes until the pH of the solution is 7.0. The mixture is maintained all the while at a temperature of about 22° C. The mixture at this temperature is stirred for 30 minutes then filtered and dried. Analysis shows the dried material to have the stoichiometric formula $Li_{0.017}MnO_2$. The material is then heated to 600° C. for 24 hours to convert it to $Li_{0.017}Mn_2O_3$. This material is then heated with lithium carbonate at temperatures between 700° C. and 900° C. to form the spinel product of stoichiometric formula $Li_xMn_2O_{4+d}$ (x=1.05,d=0.2).

A spinel product (sample 3C) with prelithiation is made as follows:

Approximately 125 grams of the rinsed and dried EMD is suspended in fresh deionized water and 3.0 grams of lithium hydroxide is added over a period of about 5 minutes until the pH of the solution is 10.0. The mixture is maintained all the while at a temperature of about 22° C. The mixture at this temperature is stirred for 30 minutes then filtered and dried. Analysis shows the dried material to have the stoichiometric formula $Li_{0.041}MnO_2$. The material is then heated to 600° C. for 24 hours to convert it to $Li_{0.041}Mn_2O_3$. This material is then heated with lithium carbonate to temperatures between 700° C. and 900° C. to form the spinel product of stoichiometric formula $Li_xMn_2O_{4+d}$ (x=1.05,d=0.2).

A spinel product (sample 3D) with prelithiation is made as follows:

Approximately 125 grams of the rinsed and dried EMD is suspended in fresh deionized water and 3.7 grams of lithium hydroxide is added so that the pH of the solution is 11.0. The mixture is maintained all the while at a temperature of about 22° C. The mixture at this temperature is stirred for 30 minutes then filtered and dried. Analysis showed the dried material to have the stoichiometric formula $Li_{0.052}MnO_2$. The material is then heated to 600° C. for 24 hours to convert it to $Li_{0.052}Mn_2O_3$. This material is then heated with lithium carbonate to temperatures between 700° C. and 900° C. to form the spinel product of stoichiometric formula $Li_xMn_2O_{4+d}$ (x=1.05,d=0.2).

EXAMPLE 4

A 2000 gram sample of particulate electrolytic manganese dioxide (battery grade EMD from Kerr-McGee Corp. lot no. 9864) is acid washed by adding 2500 milliliter of 1 molar $H_2SO_4$ and stirring the mixture for 1 hour. At the end of the hour the stirring is stopped and the acid solution is poured off leaving the electrolytic manganese dioxide (EMD) behind. The EMD is subjected to a second washing with 1 molar $H_2SO_4$, same as the first. After the second wash the acid solution is poured off and the EMD rinsed with deionized water and allowed to stand overnight. The following day the EMD is rinsed 3 additional times with fresh deionized water. After the last water rinse the EMD is suspended in fresh deionized water and 85 grams of lithium hydroxide over a period of about 5 minutes is added to bring the pH to 11.0. The solution is maintained all the while at a temperature of about 22° C. The solution at this temperature is stirred for 30 minutes and then the solid material is filtered out and dried. Analysis showed the material to be of stoichiometric formula $Li_{0.067}MnO_2$. The material is heated to 600° C. for 24 hours to convert it to $Li_{0.067}Mn_2O_3$. This material is then heated with lithium nitrate at temperatures between 700° C. and 900° C. for 24 hours to form a spinel product of stoichiometric formula $Li_xMn_2O_{4+d}$ (x=1.05,d=0.2).

EXAMPLE 5

A 2000 gram sample of particulate electrolytic manganese dioxide (battery grade EMD from Kerr-McGee Corp. lot no. 9864) is acid washed by adding 2500 milliliter of 1 molar $H_2SO_4$ and stirring the mixture for 1 hour. At the end of the hour the stirring is stopped and the acid solution is poured off leaving the electrolytic manganese dioxide (EMD) behind. The EMD is subjected to a second washing with 1 molar $H_2SO_4$, same as the first. After the second wash the acid solution is poured off and the EMD rinsed with deionized water and allowed to stand overnight. The following day the EMD is rinsed 3 additional times with fresh deionized water. After the last water rinse the EMD is suspended in fresh deionized water and 85 grams of lithium hydroxide is added over a period of about 5 minutes to bring the pH to 11.0. The solution is maintained all the while at a temperature of about 22° C. The solution is stirred at this temperature for 30 minutes and then the solid material is filtered out and dried. Analysis showed the material to be of stoichiometric formula $Li_{0.067}MnO_2$. This material is then heated with lithium carbonate at temperatures between 700° C. and 900° C. for 24 hours to form a spinel product of stoichiometric formula $Li_xMn_2O_{4+d}$ (x=1.05,d=0.2).

EXAMPLE 6

A 2000 gram sample of particulate electrolytic manganese dioxide (battery grade EMD from Kerr-McGee Corp. lot no. 9864) is acid washed by adding 2500 milliliter of 1 molar $H_2SO_4$ and stirring the mixture for 1 hour. At the end of the hour the stirring is stopped and the acid solution is poured off leaving the electrolytic manganese dioxide (EMD) behind. The EMD is subjected to a second washing with 1 molar $H_2SO_4$, same as the first. After the second wash the acid solution is poured off and the EMD rinsed with deionized water and allowed to stand overnight. The following day the EMD is rinsed 3 additional times with fresh deionized water. After the last water rinse the EMD is suspended in fresh deionized water and 85 grams of lithium hydroxide is added over a period of about 5 minutes to bring the pH to 11.0. The solution is maintained all the while at a temperature of about 22° C. The solution at this temperature is stirred for 30 minutes and then the solid material is filtered out and dried. Analysis showed the dried material to be of stoichiometric formula $Li_{0.067}MnO_2$. The material is heated to temperatures between 850 and 1000° C. for 24 hours to convert it to $Li_{0.067}Mn_3O_4$. This material is then heated with lithium carbonate at temperatures between 700 and 900° C. for 24 hrs. to form a spinel product of stoichiometric formula $Li_xMn_2O_{4+d}$ (x=1.05,d=0.2).

Performance Tests

The performance of each of the lithium manganese oxide spinel products (samples 3A–3D) made in Example 3 are tested by utilizing the spinel product as a cathode material (positive electrode) in a rechargeable (secondary) cell. A cathode is constructed from each of the spinel products by forming a mixture of spinel (60 wt. %), carbon (35 wt. %) and Teflon (tetrafluoroethylene) (5 wt %). The mixture is compressed and 60 milligrams of the compressed mixture is utilized as cathode material. The prepared cathode is incorporated into a coin cell having a metallic lithium anode and electrolyte of 1 molar $LiPF_6$ in equal parts of ethylene carbonate and dimethyl carbonate solvent.

Each of the coin cells is subjected to cycling (charge/discharge) tests wherein the lithium cells are cycled between 4.3 and 3.0 volts at a current density of 0.5 milliamp/cm². The spinel between charged and discharged states of the cells being tested may have the stoichiometric formula $Li_xMn_2O_{4+d}$ (0.1<x<1.2). The loss in specific capacity of the spinel (mAmphr/g per cycle averaged over 50 cycles) is recorded in the following table. The spinel made in accordance with the method of the invention involving a pre-lithiation step as above described in Example 3 shows better cycling characteristics, i.e. less capacity loss after 50 cycles than the comparative spinel (sample 3A) which did not employ a prelithiation step.

TABLE 1

| Sample | Pretreatment with LiOH, final pH | Spinel[1], Capacity Loss mAmp-hr/g per cycle (50 cycles) | Prelithiated manganese dioxide $Li_xMnO_2$ |
| --- | --- | --- | --- |
| 3A[2] | none | −0.39 | $MnO_2$ |
| 3B | 7.0 | −0.17 | $Li_{0.017}MnO_2$ |
| 3C | 10.0 | −0.14 | $Li_{0.041}MnO_2$ |
| 3D | 11.0 | −.11 | $Li_{0.052}MnO_2$ |

Notes:
1. Spinel product/in each case is $Li_{1.05}Mn_2O_{4.2}$, i.e., before cell cycling.
2. Comparative sample - no prelithiation of $MnO_2$ before spinel product is made.

In one embodiment the $Li_xMn_2O_{4+d}$ spinel (0.9<x<1.2 and 0<d<0.4) may be physically admixed with a partially substituted nickelite or mixture of partially substituted nickelites to form the active material in a cathode (positive electrode) for a lithium ion cell. The partially substituted nickelites which can be advantageously admixed with $Li_xMn_2O_{4+d}$ spinel (0.9<x<1.2 and 0<d<0.4) to form positive electrodes (cathodes) for lithium ion cells may desirably be selected from $LiNi_{(1-x)}Al_xO_2$ ($x_{max}$=0.25), $LiNi_{(1-x)}Fe_xO_2$, $LiNi_{(1-x)}Mn_xO_2$, $LiNi_{(1-x)}Ti_{(x/2)}Mg_{(x/2)}O_2$ ($x_{max}$=0.25) and $LiNi_{(1-x-y)}Co_{(x)}Ti_{(y/2)}Mg_{y/2}O_2$, $LiNi_xCo_{1-x}O_2$ (0.1<x<0.9) or $LiNi_xMg_{1-x}O_2$ (0.85<x<0.97) or mixtures thereof.

Preferably, the lithium manganese oxide spinel $Li_xMn_2O_{4+d}$ (0.9<x<1.2 and 0<d<0.4) may be physically admixed with a partially substituted nickelite, preferably, $LiNi_xCo_{1-x}O_2$ (0.1<x<0.9) or $LiNi_xMg_{1-x}O_2$ (0.85<x<0.97) and mixtures thereof to form a mixture of active material which may be advantageously used to form the active material in a positive electrode (cathode) for rechargeable lithium ion cells. The lithium ion cells may employ either liquid or solid electrolyte. Such active material mixtures may be employed instead of conventional $LiCoO_2$ active material for lithium ion cell cathodes, and are safer and have less environmental impact upon disposal than $LiCoO_2$. A preferred cathode mixture for lithium ion cells, particularly lithium ion cells with liquid electrolyte, comprises a mixture of $Li_xMn_2O_{4+d}$ spinel (0.9<x<1.2 and 0<d<0.4) and $LiNi_xCo_{1-x}O_2$ (0.1<x<0.9). Such cathode mixture gives unexpected performance improvement over lithium ion cells having cathodes with active material formed only of $Li_xMn_2O_{4+d}$ spinel or lithium ion cells having cathodes formed of mixtures of ($Li_xMn_2O_{4+d}$) spinel and nickelite ($LiNiO_2$) or mixtures of ($Li_xMn_2O_{4+d}$) spinel and $LiCoO_2$, particularly in lithium ion cells with liquid electrolyte. The liquid electrolyte may be liquid electrolytes conventionally employed in lithium ion cells. The electrolyte may be a liquid electrolyte comprising a lithium salt dissolved in a mixture of non-aqueous solvents. The lithium salt in the liquid electrolyte may desirably be lithium hexafluorophosphate ($LiPF_6$), lithiumtetrafluoroborate ($LiBF_4$), lithiumtrifluorosulfonimide, lithiumperchlorate ($LiClO_4$), lithiumhexafluoroarsenate ($LiAsF_6$) and mixtures thereof. The liquid electrolyte may be readily prepared by dissolving the lithium salts in a nonaqueous solvent of propylene carbonate, ethylene carbonate, diethylcarbonate, ethylmethycarbonate, dimethoxyethane, tetrahydrofuran, and mixtures of two or more thereof. A preferred salt may be lithium hexafluorophosphate ($LiPF_6$) and preferred solvent may advantageously include dimethyl carbonate (DMC), ethylene carbonate (EC), propylene carbonate (PC) and mixtures thereof. Alternatively, the the electrolyte may be a conventional solid electrolyte for lithium ion cells, for example, as described in U.S. Pat. No. 5,429,890, incorporated by reference.

Lithium manganese oxide spinel ($Li_xMn_2O_{4+d}$) may be readily prepared by the method of the invention and may be used as the sole active material in lithium ion cell cathodes. However, the specific capacity (mAmp-hr/g) of lithium manganese oxide spinel is less than that of $LiCoO_2$. The specific capacity of the cathode of lithium ion cells may be improved when the spinel is admixed with nickelite ($LiNiO_2$) which has a higher specific capacity. However, the addition of nickelite ($LiNiO_2$) to spinel reduces the cyclability (capacity retention per cycle) of the cathode. An additional drawback is that such mixture may cause safety concerns when the cell is overcharged.

It has been has determined that partially substituted nickelites, preferably, $LiNi_xCo_{1-x}O_2$ (0.1<x<0.9) or $LiNi_xMg_{1-x}O_2$ (0.85<x<0.97) or mixtures thereof may be advantageously admixed with lithium manganese oxide $Li_xMn_2O_{4+d}$ spinel to form the active material for lithium ion cell cathodes with improved specific capacity and also improved cyclability over cathodes employing $Li_xMn_2O_{4+d}$ spinel alone or spinel admixed with $LiNiO_2$ nickelite. Another advantage is that $LiNi_xCo_{1-x}O_2$ or $LiNi_xMg_{1-x}O_2$ or mixtures thereof when mixed with spinel ($Li_xMn_2O_{4+d}$) results in a safer cell, particularly during overcharge conditions, than when using a mixture of nickelite $LiNiO_2$ and spinel. It is not known with certainty why the cyclability (capacity retention per cycle over the useful life of the cell) improves when the partially substituted nickelite, particularly $LiNi_xCo_{1-x}O_2$ or $LiNi_xMg_{1-x}O_2$ is admixed with spinel ($Li_xMn_2O_{4+d}$). $LiNi_xCo_{1-x}O_2$ or $LiNi_xMg_{1-x}O_2$ has a lower voltage (EMF) than spinel ($Li_xMn_2O_{4+d}$). It is conjectured that when the cell is charged different lithium ion from $LiNi_xCo_{1-x}O_2$ or $LiNi_xMg_{1-x}O_2$ transfers from the cathode to form a passivating layer on the anode surface. This enables the spinel to remain fully lithiated and in turn makes the electrolyte less prone to decomposition. Decomposition of the electrolyte results in acid production which in turn can increase capacity loss during cycling and storage. A cathode formed of a mixture of lithium manganese oxide spinel and partial cobalt or magnesium substituted $LiNiO_2$, namely, $LiNi_xCo_{1-x}O_2$ or $LiNi_xMg_{1-x}O_2$ and mixtures thereof, is also more economical to manufacture and results in safer cells than when conventional $LiCoO_2$ is employed as active material.

Specifically, it has been determined that the capacity of a lithium ion cell with liquid electrolyte having a positive electrode (cathode) comprising 40 percent by weight $LiNi_{0.8}Co_{0.2}O_2$ and 60 percent by weight $Li_xMn_2O_{4+d}$ spinel may have about the same capacity as a conventional rechargeable cell with a cathode comprising $LiCoO_2$ active material, but is safer than the conventional cell and poses less of a potential environmental hazard than the conventional cell.

The positive and negative electrodes may be configured in a conventional jelly roll configuration with layer of separator material placed therebetween. In such embodiment the jelly roll may be configured as described in U.S. Pat. No. 5,370,710 herein incorporated by reference in its entirety. The configuration shown in FIG. 1 is representative. As shown in FIG. 1 the negative electrode may be formed of a layer 30 of lithium or carbon coated onto a metal support 20. The positive electrode 50 (cathode) may be formed of the above described mixture of a partially substituted nickelite and lithium manganese oxide spinel ($Li_xMn_2O_{4+d}$). Preferably, the positive electrode 50 comprises a mixture of $LiNi_{0.8}Co_{0.2}O_2$ and $Li_xMn_2O_{4+d}$ spinel as above described which is coated onto a metal support 60. Separator 40 saturated with electrolyte, preferably liquid electrolyte may be located between negative and positive electrodes 30 and 50, respectively. Alternatively, the positive and negative electrodes may be in a conventional configuration of a coin cell.

In another preferred embodiment the cathode (positive electrode) for lithium ion cells may be formed by applying a first layer comprising essentially $Li_xMn_2O_{4+d}$ spinel as active material onto a conductive substrate such as one composed of titanium, stainless steel, aluminum, aluminum alloys. A second layer, namely, a layer comprising active material formed essentially of partially substituted nickelite, for example, $LiNi_xCo_{1-x}O_2$ or $LiNi_xMg_{1-x}O_2$ and mixtures thereof is applied over the first layer thus contacting the first layer and forming a bi-layered cathode. The second layer active material is preferably comprised essentially of $LiNi_xCo_{1-x}O_2$ (0.1<x<0.9). Thus, the active portion of the cathode may be formed of a film layer comprising essentially lithium manganese oxide spinel as active material, which may be overcoated with a second layer consisting of $LiNi_xCo_{1-x}O_2$ or $LiNi_xMg_{1-x}O_2$, or mixtures thereof as active material. The first layer may be formed advantageously of a mixture of $Li_xMn_2O_{4+d}$ spinel (90 wt %), carbon (5 wt %), and Teflon (tetrafluoroethylene)(5 wt %). A preferred second layer may be formed by mixing $LiNi_{0.8}Co_{0.2}O_2$ with carbon and Teflon. The active material in the cathode (first and second layers) comprises between about 50 and 95 percent by weight of the positive electrode desirably between about 30 and 40 percent by weight of the cathode (excluding any support for the cathode material). The weight ratio of the active material in the second layer (partially substituted nickelite) to active material in the first layer essentially $Li_xMn_2O_{4+d}$ spine may advantageously be between about 0.04 and 0.50, preferably between about 0.25 and 0.40. Preferably, the partially substituted nickelite forming the active material in the second layer comprises between about 10 and 50 percent, preferably, between about 30 and 40 percent by weight of the cathode (excluding an metal substrate support for the cathode). The weight ratio of the active material comprising partially substituted nickelite in the second layer to $Li_xMn_2O_{4+d}$ spinel active material in the first layer may advantageously be between about 0.04 and 0.50, preferably between about 0.25 and 0.40. The electrolyte for the cell in this embodiment may be either liquid electrolyte or solid electrolyte conventionally employed in lithium ion cells, as above referenced.

Figure 2:
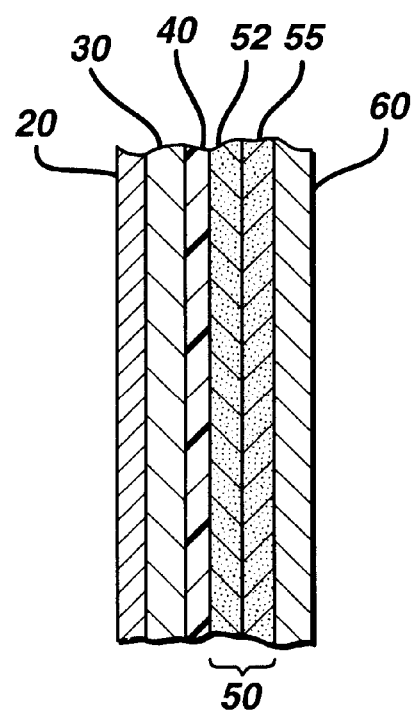
FIG. 2 is a schematic drawing showing an embodiment of the cathode construction in cross section wherein the cathode comprises multiple layers.

The configuration shown in FIG. 2 is representative of a jelly roll configuration utilizing the latter embodiment. As shown in FIG. 2 the negative electrode may be formed of a layer 30 of lithium or carbon coated onto a metal support 20. The positive electrode (cathode) 50 may be formed of the above discussed first layer 55 coated onto metal support 60. The above referenced second layer 52 is coated onto first layer 55. Separator 40 saturated with electrolyte, preferably liquid electrolyte may be located between negative and positive electrodes 30 and 50, respectively. Alternatively, the positive and negative electrodes may be in a conventional configuration of a coin cell.

The lithium ion cell utilizing the above described cathodes of the invention may otherwise be formed of conventional components. For example the cell's negative electrode may be formed of carbon, which may comprise mesophase carbon, soft or hard disordered carbon, acetylene black, synthetic or natural graphite, and mixtures thereof. The form of carbon selected may have an effect on the heat stability of the cell. A wide variety of carbons may be used for the negative electrode of lithium ion cells and is well known in the art. The carbon is coated or affixed onto a conductive support which may desirably be a sheet of copper, nickel, stainless steel, or titanium. The carbon may be applied to the support in the form of a coating desirably comprising a binder and conductive filler. The binder may desirably be carboxymethylcellulose, polyvinylidene fluoride, fluororesin, styrene butadiene rubber and the like to enable it to adhere to the support. A preferred binder may be polyvinylidene fluoride comprising between about 5 and 10% by weight of the negative electrode. The conductive filler may desirably be graphite or acetylene black.

A suitable support 60 for the above described cathode mixtures of the invention may desirably be titanium, stainless steel, aluminum, aluminum alloys and the like which are known in the art and conventionally employed as supports for the positive electrode of lithium ion cells.

The electrolyte is preferably a liquid electrolyte comprising a lithium salt dissolved in a nonaqueous solvent. The lithium salt may desirably be lithium hexaflurophosphate, lithiumtetrafluoroborate, lithiumtrifluorosulfonimide, lithiumperchlorate, lithiumhexafluroarsenate and mixtures thereof. A preferred lithium salt is lithium hexaflurophosphate. The electrolyte may be prepared by dissolving the lithium salts in a nonaqueous solvent of propylene carbonate, ethylene carbonate, diethylcarbonate, ethylmethycarbonate, dimethoxyethane, tetrahydrofuran, and mixtures of two or more thereof. The lithium salt may desirably comprise between about 0.4 and 2 moles per liter of the electrolyte solution.

The separator 40 between the electrodes may be in the form of a layer of woven or nonwoven ion porous material. Conventional separators for lithium ion cells known in the art may be employed. Suitable separators, for example, may be formed of woven or nonwoven polymeric material comprising polyethylene, polypropylene, polytetrafluoroethylene or ion porous composites comprising such material.

EXAMPLE 7

The following is an example illustrating the performance of lithium ion coin cells with the cathode formed of a mixture of lithium manganese oxide spinel, $Li_xMn_2O_{4+d}$ (0.9<x<1.2 and 0<d<0.4), and lithium nickel cobalt oxide, $LiNi_{0.8}CoO_{0.2}O_2$ as active material for the positive electrode. Cathode mixtures are formed of 90 percent by weight of a mixture of $LiNi_{0.8}CoO_{0.2}O_2$ and $Li_xMn_2O_{4+d}$, 5 percent by weight carbon black and 5 percent by weight tetrafluoroethylene (Teflon) resin. The cathode mixtures are coated onto a conductive metal support such as titanium or stainless steel. Coin cells are prepared with various concentrations of $LiNi_{0.8}CoO_{0.2}O_2$ in the cathode. The cells are otherwise the same. The concentration of $LiNi_{0.8}CoO_{0.2}O_2$ in the cells varies from 10 percent by weight to 50 percent by weight of the total cathode mixture. The concentration of the total active material comprising $LiNi_{0.8}CoO_{0.2}O_2$ and $Li_xMn_2O_{4+d}$ in the cathode remains at 90 percent by weight of the cathode mixture in each case. The test coin cells are made with 120 milligrams of compressed cathode mixture forming the positive electrode. The negative electrode of the coin cells are metallic lithium and the electrolyte is formed of a solution of 1 Molar (1 mole per liter) lithium hexafluorophosphate ($LiPF_6$) in equal part by volume of ethylene carbonate and dimethylcarbonate solvents. Like comparison cells are also prepared but with cathodes formed of $Li_xMn_2O_{4+d}$ spinel and lithium cobalt oxide ($LiCoO_2$) as active cathode material.

Each of the test coin cells are subjected to cycling tests wherein the cells are cycled between 4.3 and 3.0 volts at a current density of 0.5 milliAmp per square centimeter. The specific capacity of the cathode active material in the test cells formed of mixtures of $LiNi_{0.8}Co_{0.2}O_2$ and $Li_xMn_2O_{4+d}$ spinel at varying concentrations of $LiNi_{0.8}Co_{0.2}O_2$ is compared to the specific capacity of the cathode active material formed of mixtures of $LiCoO_2$ and $Li_xMn_2O_{4+d}$ spinel forming the cathode of the comparison cells. The $LiNi_{0.8}Co_{0.2}O_2$ may be considered the dopant in the test cells and the $LiCoO_2$ may be considered the dopant in the comparison cells. As shown in Table 2 the specific capacity of cathodes of cells having cathodes formed of mixtures of $LiNi_{0.8}Co_{0.2}O_2$ and $Li_xMn_2O_{4+d}$ is higher than the comparison cells having cathodes formed of $LiCoO_2$ and $Li_xMn_2O_{4+d}$ at the same concentration level of $LiNi_{0.8}CO_{0.2}O_2$ dopant in the test cells versus $LiCoO_2$ dopant in the comparison cells. The cells having cathodes formed of mixtures of $LiNi_{0.8}Co_{0.2}O_2$ and $Li_xMn_2O_{4+d}$ active material are safer than cells having a cathode formed of 100% $LiCoO_2$ active material, or 100% LiNiO2 or 100% $LiNi_{0.8}Co_{0.2}O_2$ as determined by DSC (differential scanning calorimetry) peak power tests (Table 3). The peak power tests measure the rate of heat output of the cell. Such tests are performed by a technique in which the temperature of a sample is compared with an inert reference material during a programmed change in temperature. Cells having a lower rate of heat output are generally safer than cells with a higher rate under the same conditions. The peak power for the above test cells with cathodes (positive electrodes) containing cathode active mixtures of $LiNi_{0.8}Co_{0.2}O_2$ and $Li_xMn_2O_{4+d}$ spinel at dopant concentrations of $LiNi_{0.8}Co_{0.2}O_2$ between 10 and 50 percent by weight is between 21 and 42 Joules/g-min as indicated in Table 3. (The dopant percent by weight is the percent by weight of dopant in the cathode excluding the metal support for the cathode). By contrast the peak power of the comparison cells having a positive cathode of 100% $LiCoO_2$ active material is 49 Joules/g-min; the peak power of comparison cells having 100% $LiNi_{0.8}Co_{0.2}O_2$ active material is 58.8 Joules/g-min; and the peak power of comparison cells having 100% $LiNiO_2$ active material is 191.8 Joules/g-min. The lower peak power obtained in the cells having cathodes formed of mixtures of $LiNi_{0.8}Co_{0.2}O_2$ and $Li_xMn_2O_{4+d}$ spinel are an indication that these cells are safer than cells having cathodes of active material 100% $LiCoO_2$ or 100% $LiNiO_2$, or 100% $LiNi_{0.8}Co_{0.2}O_2$.

TABLE 2

| Mixed Spinel Cathode Wt. % $LiNi_{0.8}Co_{0.2}O_2$ or $LiCoO_2$ in Cathode | Cathode Mixture $LiNi_{0.8}Co_{0.2}O_2$ and $Li_xMn_2O_{4+d}$ Sp. Capacity mAmp-hr/g (5 cycle average) | Cathode Mixture $LiCoO_2$ and $Li_xMn_2O_{4+d}$ Sp. Capacity mAmp-Hr/g (5 cycle avg.) |
|---|---|---|
| 10% | 121.2 | 117.5 |
| 20% | 127.7 | 120.2 |
| 30% | 134.3 | 123 |
| 40% | 140.8 | 125.8 |
| 50% | 147.3 | 128.5 |

The cells are also charged and stored at 60° C. to accelerate aging. The cells are then discharged after the first and fourth week of storage and the loss of specific capacity determined. As shown in Table 4 the specific capacity loss (5 cycle average) of the test cells having cathodes formed of mixtures of $LiNi_{0.8}Co_{0.2}O_2$ and $Li_xMn_2O_{4+d}$ is least when the percent by weight of the $LiNi_{0.8}Co_{0.2}O_2$ in the total cathode is between about 30 and 40 percent by weight. As shown in Table 4 the addition of $LiNi_{0.8}Co_{0.2}O_2$ to the cathode comprising $Li_xMn_2O_{4+d}$ spinel essentially eliminates capacity loss even after the cell is stored in discharged condition for one month at 60° C.

TABLE 3

| Mixed Spinel Cathode Wt. % $LiNi_{0.8}Co_{0.2}O_2$ in Cathode | DSC Heat Output Joules/g-min |
|---|---|
| 10% | 21 |
| 30% | 35 |
| 40% | 35 |
| 50% | 42 |
| 100% (no spinel) | 58.8 |

Note: Peak power of cells with 100% $LiCoO_2$ as active material in cathode is 49 Joules/g-min. and with 100% $LiNiO_2$ as active material is 191.8 Joules/g-min.

TABLE 4

| Mixed Spinel Cathode $LiNi_{0.8}Co_{0.2}O_2$ and $Li_xMn_2O_{4+d}$. Wt. % $LiNi_{0.8}Co_{0.2}O_2$ in Cathode | Capacity Loss After 1 Week Storage at 60° C. mAmp-Hr/g (5 cycle avg.) | Capacity Loss After 4 Weeks Discharge Storage (60° C.) mAmp-Hr/g (5 cycle avg.) |
|---|---|---|
| 0% | 8.88 | 26.84 |
| 30% | 0.09 | 2.91 |
| 40% | 1.41 | 5.08 |

EXAMPLE 8

A coin cell is prepared with the same components and compositions as described in Example 7 except that a bi-layered positive electrode is employed. The bi-layered positive electrode comprises a first layer formed of a mixture containing only lithium manganese oxide spinel $Li_{1.05}Mn_2O_{4.2}$ as active material which is coated onto a conductive substrate of aluminum material. A second layer comprising a mixture with active material consisting only of lithium nickel cobalt oxide ($LiNi_{0.8}Co_{0.2}O_2$) is coated over the first layer. The first layer is formed of a mixture of $Li_{1.05}Mn_2O_{4.2}$ spinel (90 wt %), carbon (5 wt %), and Teflon (tetrafluoroethylene) (5 wt %). The mixture contains 70 milligrams of $Li_{1.05}Mn_2O_{4.2}$. The second layer is formed of a mixture of (LiNi$_{0.8}$Co$_{0.2}$O$_2$) with carbon (5 wt %) and Teflon (5 wt %). The (LiNi$_{0.8}$Co$_{0.2}$O$_2$) and Li$_{1.05}$Mn$_2$O$_{4.2}$ together comprise about 90 percent by weight of the first and second layers in each coin cell. The cells are prepared with various concentrations of LiNi$_{0.8}$Co$_{0.2}$O$_2$ in the second layer. The total weight of the active material in the second layer is about 30 milligrams. The cells are otherwise the same.

The cells are made with concentrations of LiNi$_{0.8}$Co$_{0.2}$O$_2$ dopant in the second layer varied from 10 percent by weight to 50 percent by weight of the total cathode (first and second layers). The concentration of the active material comprising LiNi$_{0.8}$Co$_{0.2}$O$_2$ and Li$_x$Mn$_2$O$_{4+d}$ in the two layers remains at 90 percent by weight of the total cathode (first and second layers) in each cell. The negative electrode of the coin cells is metallic lithium and the electrolyte is formed of a solution of 1 Molar (1 mole per liter) lithium hexafluorophosphate (LiPF$_6$) in equal part by volume of ethylene carbonate and dimethylcarbonate solvents. The positive electrode is arranged so that the second layer in the cathode faces the negative electrode with conventional separator material therebetween.

Performance tests are made and compared with like cells having the same components except that the cathode in the comparison cell is formed of mixtures of lithium cobalt oxide (LiCoO$_2$) and Li$_x$Mn$_2$O$_{4+d}$ spinel, wherein the LiCoO$_2$ dopant comprises between about 10 and 50 percent by weight of the total cathode. The cells are cycled between 4.3 and 3.0 volts at a current density of 0.5 milliAmp/cm2. The specific capacity of a cathodes (Amp-hr per gram of active material) formed of the above described bi-layered cathodes of the test cells is compared to the specific capacity of the comparison cells formed of mixtures of lithium cobalt oxide (LiCoO$_2$) dopant mixed with Li$_x$Mn$_2$O$_{4+d}$ spinel at the same level of dopant concentration in the cathode. The specific capacity (milliAmp-hr per gram) of the active material in the test cells is greater than the specific capacity in the comparison cells (at same dopant level). The results shown in Table 2 are representative and applicable to this example.

The cells having the above described bi-layered cathode are also safer than the comparison cells formed of active material composed only of LiCoO$_2$ as determined by DSC peak power tests. The peak power (Joules/g-min) is determined in coin cells with the above described bi-layered cathodes wherein the first layer is formed of Li$_x$Mn$_2$O$_{4+d}$ spinel active material and the second of layer comprises mixtures having active material consisting only of LiNi$_{0.8}$Co$_{0.2}$O$_2$, wherein the LiNi$_{0.8}$Co$_{0.2}$O$_2$ comprises between about 10 and 50 percent by weight of the total cathode (first and second layers) and the LiNi$_{0.8}$Co$_{0.2}$O$_2$ and Li$_x$Mn$_2$O$_{4+d}$ comprises about 90 percent of the total cathode (first and second layers). The peak power in the test cells is lower than the peak power obtained with comparison cells having cathode formed of active material composed of only LiCoO$_2$. The lower peak power in the cells having the bi-layered cathodes is an indication that these cells are safer than cells having conventional cathodes formed of LiCoO$_2$ active material.

Although the present invention has been described with reference to specific embodiments it should be understood that variations are possible without departing from the scope and concept of the invention. Accordingly, the present invention is not intended to be limited to the specific embodiments described herein, but is defined by the claims and equivalents thereof.

What is claimed is:

1. A rechargeable lithium ion cell comprising a positive electrode, a negative electrode and electrolyte, wherein the positive electrode comprises a conductive support, a first layer on said conductive support, said first layer comprising active material comprising lithium manganese oxide of spinel structure of formula Li$_x$Mn$_2$O$_{4+d}$ (0.9<x<1.2 and 0<d<0.4) and a second layer over said first layer, said second layer comprising active material comprising partially substituted nickelite selected from the group consisting of LiNi$_x$Co$_{1-x}$O$_2$ (0.1<x<0.9) and LiNi$_x$Mg$_{1-x}$O$_2$ (0.85<x<0.97) and mixtures thereof.

2. The lithium ion cell of claim 1 wherein the electrolyte is a liquid during the useful life of the cell.

3. The lithium ion cell of claim 1 wherein the electrolyte is a liquid comprising a lithium salt dissolved in an non-aqueous solvent.

4. The lithium ion cell of claim 1 wherein the electrolyte is a liquid comprising lithium hexafluorophosphate (LiPF$_6$) dissolved in a nonaqueous solvent.

5. The lithium ion cell of claim 1 wherein the electrolyte is a solid.

6. The lithium ion cell of claim 1 wherein the active material in said second layer comprises a lithium nickel cobalt oxide having the formula LiNi$_x$Co$_{1-x}$O$_2$ (0.1<x<0.9).

7. The lithium ion cell of claim 6 wherein said active material in said second layer comprises LiNi$_{0.8}$Co$_{0.2}$O$_2$.

8. The lithium ion cell of claim 1 wherein said active material in said first and second layer comprises between about 50 and 95 percent by weight of said first and second layer.

9. The lithium ion cell of claim 1 wherein said partially substituted nickelite comprises between about 10 and 50 percent by weight of said first and second layer.

10. The lithium ion cell of claim 1 wherein said partially substituted nickelite comprises between about 30 and 40 percent by weight of said second layer.

11. The lithium ion cell of claim 1 wherein the weight ratio of said partially substituted nickelite in said second layer to Li$_x$Mn$_2$O$_{4+d}$ spinel (0.9<x<1.2 and 0<d<0.4) in said first layer is between about 0.04 and 0.50.

12. The lithium ion cell of claim 1 comprising a separator between said negative and positive electrodes and wherein said second layer of the positive electrode contacts said first layer and the negative and positive electrodes are oriented so that said second layer is closer to said separator electrode than said first layer.

* * * * *